United States Patent

[11] 3,624,009

[72] Inventors Wilbur B. Sussman
Dayton;
Craig D. Belcher, Cincinnati; George E. Brown, Jr., Cincinnati, all of Ohio
[21] Appl. No. 873,800
[22] Filed Nov. 4, 1969
[45] Patented Nov. 30, 1971
[73] Assignee Fiber Process, Inc.
Piqua, Ohio
Continuation-in-part of application Ser. No. 687,299, Dec. 1, 1967, now abandoned.
This application Nov. 4, 1969, Ser. No. 873,800

[54] METHOD FOR RECLAIMING COMMERCIALLY USEFUL FIBERS AND RESIN FROM SCRAP MATERIAL
10 Claims, 1 Drawing Fig.

[52] U.S. Cl. .................................................. 260/2.3, 134/38, 134/42
[51] Int. Cl. .................................................. C08f 47/24
[50] Field of Search .......................................... 260/2.3; 117/63

[56] References Cited
UNITED STATES PATENTS
3,048,218   8/1962   Gunther .................... 260/2.3
FOREIGN PATENTS
617,788   4/1961   Canada ...................... 260/2.3
936,826   9/1963   Great Britain ............... 260/2.3

*Primary Examiner* — Samuel H. Blech
*Attorney* — Melville, Strasser, Foster and Hoffman ABSTRACT: Scrap fabrics supported synthetic resin are first washed with solvent under controlled heat, pressure and agitation to produce as a first product clean, dried, resin and solvent free fibers. The polymer solution extracted from the washing stage is treated in one or more stages to produce as a second product granular, clean, dried resin compound. Clean solvent is recovered for recirculation through the system.

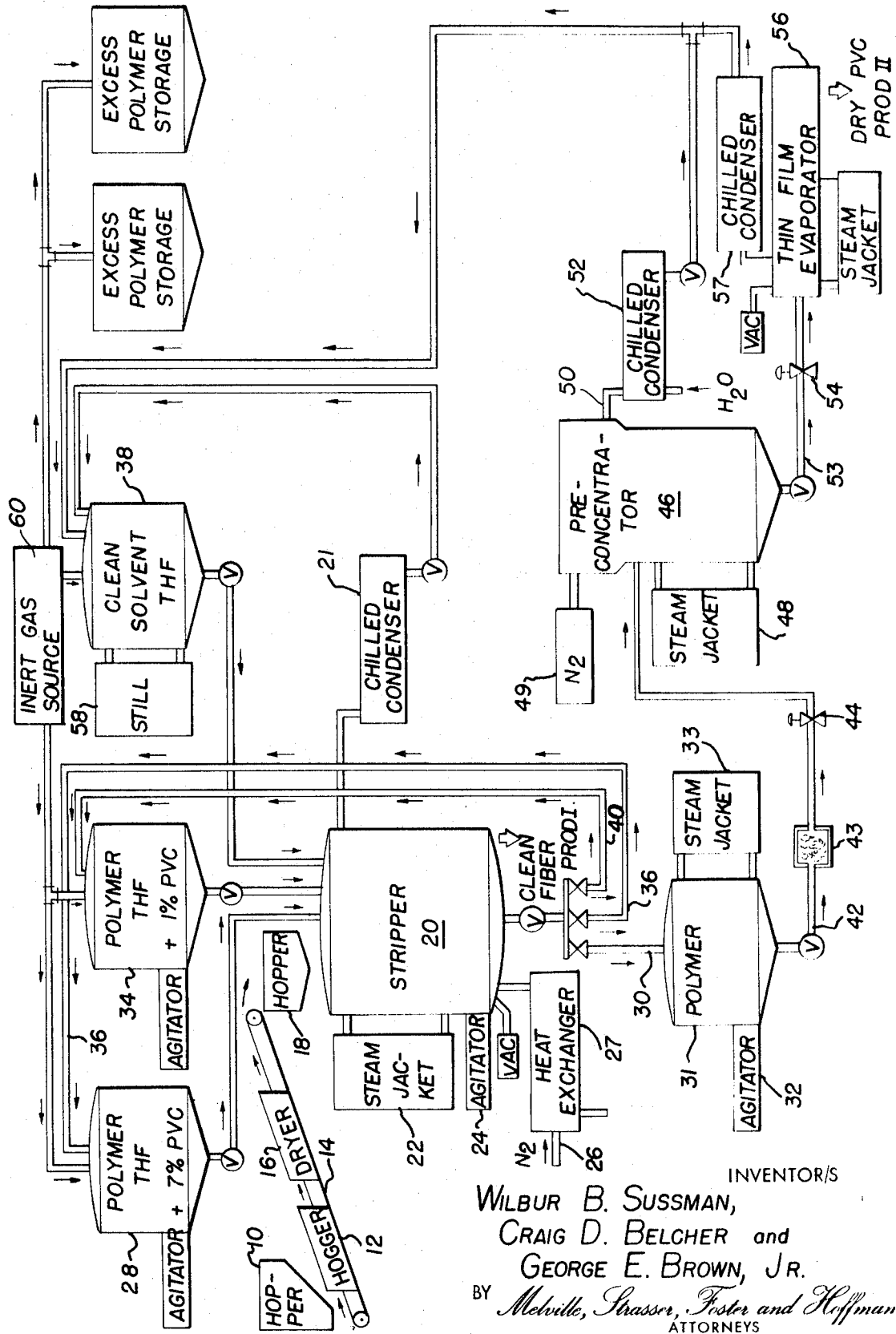

3,624,009

METHOD FOR RECLAIMING COMMERCIALLY USEFUL FIBERS AND RESIN FROM SCRAP MATERIAL

This is a continuation-in-part of application Ser. No. 687,299 filed Dec. 1, 1967, in the name of George E. Brown, Jr., and entitled Method and Apparatus for Reclaiming Natural Fiber from Scrap Material now abandoned.

BACKGROUND OF THE INVENTION

A very desirable commercial product can be produced by combining a fiber fabric (natural or synthetic, singly or in combination) with a synthetic resin. Such fabric finds widespread use in the automobile industry for the production of upholstery and interiors. The fiber of such a fabric is typically rayon or cotton, and the resin is polyvinyl chloride (PVC).

This material is supplied in rolls or bolts which are then cut for use by the manufacturer. The scrap problem, particularly in the automobile industry, is of enormous proportions. First of all, many thousands of tons of this scrap material are generated. Because of the chemical composition of the material, it is impossible to burn the scrap without causing harmful air pollution Therefore, the bulk of the scrap is used today as landfill, which is the only practical means of disposal yet discovered.

Rapidly developing technology has produced effective solvents for such synthetic resins. Stripping processes utilizing these solvents have been proposed, but never successfully developed for a variety of reasons. In the first place, the cost of the resin and processing in addition to the cost of scrap isn't justified by the reclamation of cleaned fibers alone.

Keeping the above comments in mind, it is a primary object of this invention to provide a method which will permit the recovery of both fabric fibers and resin from scrap material in a reusable, salable condition.

A further object of the invention is the development of such a process which is quick, simple, and efficient in operation.

Still another object of the invention is such a process wherein the solvent is continuously recirculated, and the solvent loss in the system is held to an absolute minimum.

SUMMARY OF THE INVENTION

This invention, broadly considered, contemplates the treatment of scrap resin supported fabric to reclaim in a commercially useful state both the resin and the fibers.

The first step is one or more washings with agitation of the scrap material with a solvent. During this washing step, heat and pressure are carefully controlled to prevent degradation of either the fabric fibers or the resin. The clean, dried fabric fibers, ready for resale are recovered directly from this first step.

The extraction from the washing step, a polymer solution including both solvent and liquid resin compound is treated under controlled condition of temperature, pressure and flow to reclaim in a granular, clean and dried condition the resin compound which is basically chemically unaltered. That is, the plasticizers, stabilizers, and fillers are intact.

Controlled heating in an inert, water free atmosphere throughout the process prevents azeotrope formation of solvent, and the clean solvent is recovered for recirculation with extremely small system solvent loss.

DESCRIPTION OF THE DRAWING

FIG. 1 is a schematic flow diagram illustrating the method of this invention.

DESCRIPTION OF THE PREFERRED EMBODIMENT

The starting raw material for the practice of the present invention constitutes scrap fabric supported synthetic resin such as the vinyl fabric used in automobile upholstery which consists of a cotton or rayon fabric covered with PVC.

Suitable scrap raw material from the hopper 10 is delivered to the hogger 12 which serves to reduce the raw material to pieces of small, relatively uniform size. Preferably, the hogger should be designed to reduce the scrap material to a size not larger than approximately 8 square inches, with the bulk (on the order of 75 percent) of material in a size range from 1 square inch to 4 square inches.

The sized material from the hogger 12 is delivered on the conveyor 14 past the drier 16 and into the feed hopper 18. While the starting material for the process of this invention is "dry" in the common sense of the word, the drier 16 is utilized to drive off ambient or residual moisture from the scrap material. The elimination of residual moisture at this step is important in minimizing azeotrope formation of the solvent as will be explained hereinafter.

Material from the feed hopper 18 is delivered in suitable batches to the stripper shown schematically at 20. The stripper is provided with a steam jacket 22 or other suitable heat source, and an agitator 24 which can provide constant or periodic agitation of the contents of the stripper.

Once the raw material is suitably delivered to the stripper, the unit is sealed and charged with inert gas from a source indicated schematically at 26. Additional heat may be supplied to the stripper by the heat exchanger 27 in the inert gas supply. Temperatures during the stripping operation are maintained below 200° F. in order to prevent degradation of the natural fibers.

The first washing step is accomplished by supplying a polymer solution from the vessel 28. The polymer solution from this vessel is a mixture of tetrahydrofuran (a known solvent for PVC, hereinafter referred to as THF) containing about 7 percent PVC. A predetermined quantity of this washing solution will be charged into the stripper 20 and the first washing cycle carried out. At the conclusion of the first cycle, the liquid withdrawn from the stripper 20 via the conduit 30 (now containing about 10 percent PVC) is taken to the vessel 31 for further processing as described hereinafter.

The second wash cycle is carried out utilizing a polymer solution from the vessel 34, which includes a mixture of THF and about 1 percent PVC. This washing cycle, in terms of time, temperature and agitation will be substantially the same as the first described washing cycle. At the conclusion of this second wash, the liquid will be withdrawn via the conduit 36. This material, now containing about 7 percent PVC is then delivered to the vessel 28 for use in the first washing cycle in the next batch of material.

The third washing cycle utilizes clean solvent (commercially pure THF) from the vessel 38. This third wash cycle will be the same as the first and second wash cycles in terms of temperature and agitation. At the conclusion of the third washing cycle, the liquid will be withdrawn via the conduit 40. This withdrawn liquid now contains about 1 percent PVC, and is delivered to the vessel 34 for use in the second wash cycle of a subsequent batch of material.

After the third wash, additional clean solvent is used to flush the residual PVC from the fibers. Flushing is continued until the solvent withdrawn via the conduit 40 is clear as determined visually by a sight glass or the like in the conduit.

It will also be understood that in order to prevent contamination of the withdrawn solvent with small fiber particles, conventional filters will be employed in each of the conduits 36 and 40.

Any solvent which is vaporized during the washing cycles is passed through the chilled condenser 21 and returned to the clean solvent storage vessel.

After extraction of the liquid following the third wash cycle, the now clean fabric fibers are dried completely by continued application of heat and heated inert gas under a vacuum. When dry, the fabric fibers may be removed from the bottom of the stripper 20 in a fully dry condition, substantially free from both PVC and trace THF. This product (designed product I) finds a ready market in, for example, the production of high rag content papers.

It will be recalled that the first liquid extraction from the stripper, a polymer mixture solution containing approximately 10 percent PVC, was conveyed to the vessel 31. It should be noted that this vessel includes an agitator 32 and steam jacket 33 to prevent settling of PVC compound. This material may continuously be fed through the conduit 42, and the filter 43 to the flow regulator 44, and thence to the preconcentrator 46. This preconcentrator which does not form a part of the invention per se, is essentially a vertical tube rising film evaporator. It is provided with a steam jacket or other suitable supply of heat 48, and a supply of inert gas 49 which will be utilized for purging prior to start up. Volatilized THF is taken off the preconcentrator at 50 and led to the chilled condenser 52 wherein the solvent vapor condenses to clean liquid solvent. This clean liquid solvent is, of course, returned to the storage vessel 38 for further use in the process.

After this preconcentrating step, the liquid taken off the bottom of the preconcentrator 46 now contains on the order of 20 percent PVC. This liquid mixture is then fed by gravity through the conduit 53 and flow regulator 54 into the thin film evaporator 56.

This thin film evaporator again does not per se form a part of this invention. The preferred construction utilizes means for distributing a thin film of the polymer solution on the inner surface of a heated drum or cylinder. The unit is under a slight vacuum and the solvent is continuously flashed off as a vapor which is condensed back into clean liquid solvent. The chilled condenser can be designed as an integral part of the thin film evaporator, or could constitute an entirely separate unit as shown at 57. The clean liquid solvent is then transported back to the vessel 38 for further use in the process.

At the same time, dry PVC is continuously extracted in solid form from the thin film evaporator 52 which represents product II of the process of this invention.

Actual tests have established that the dried PVC product just described contains less than one-half percent residual THF. There are no residual fibers of a length in excess of 0.1 inch in the reclaimed PVC. The starting chemical properties of the PVC in the scrap material are unchanged in that plasticizers, stabilizers and fillers are substantially intact. Detailed tests have established that the physical properties of the PVC are in fact improved because of the thorough homogenization caused by the reduction of the PVC to solution during the process. As such, the reclaimed product II (PVC) is equal or superior to the original PVC, and as such is a highly valuable product.

It will be observed from the foregoing description that the solvent utilized in the process travels in a fully closed system. Specifically, the solvent passes from the clean solvent storage vessel 38 through the stripper 20 to the vessel 34, again through the stripper 20 to the vessel 28, and the third time through the stripper 20 to the vessel 32. By this time, the clean solvent has picked up on the order of 10 percent PVC in solution and it now proceeds through the preconcentrator 46 and thin film evaporator 56. The application of heat during the washing cycles in the stripper and in the preconcentrator will flash off certain quantities of solvent in vapor form which are reclaimed in the chilled condensers 21 and 52 respectively. The remaining solvent is condensed at the thin film evaporator 56, and all clean solvent is returned to the vessel 38 for reuse. It will be observed that an azeotrope still 58 is combined with the vessel 38 to continually remove trace moisture from the solvent. Total system loss of solvent during the process is less than one-half percent.

It is important that the entire process of this invention be carried out with a water free atmosphere. The system should therefore be purged with inert gas prior to start up. While the drawing refers to "$N_2$," it will be understood that any available inert gas may be utilized. As previously described, inert gas may be supplied to the stripper 20 as at 26 and to the preconcentrator 46 as at 49. Ordinarily inert gas from a supply 60 will be supplied to other parts of the system such as to the vessel 28, 34, and 38.

Many modifications are possible within the scope and spirit of the process of this invention. For example, in the process as described, the stripping or washing operation is essentially a "batch" operation, while the solvent and PVC reclamation is more nearly a continuous operation. It may therefore be desirable to provide two or more strippers operating in succession, in order that the processing rate of the stripping operation can be maintained at a speed substantially equal to the capacity of the solvent and PVC reclamation portion of the system.

While the process has been described in terms of utilization of THF as a solvent, other solvents of the cyclic ether group may be utilized, such as 1 methyl 2 pyrrolidine heated to a temperature below its boiling point, or dimethyl sulfoxide. The 1 methyl 2 pyrrolidine solvent is useful in stripping acrylics, polyesters, cellulose esters and polyamides from fibers at a temperature in the range of 230° F. to 265° F. It will also be apparent that the above named solvents may be used singly or in combination if desired, and in all cases may be used at a temperature up to the boiling point of the solvent provided the temperature does not exceed the dehydration or denaturation point of the fiber being reclaimed.

Under certain circumstances, it is desirable to pass the solvent through a mix tank containing bentonitic clay before entering the stripper 20. The bentonitic clay is then carried by the solvent into the stripper, where it mixes with the scrap material to adsorb the die or pigment particles released from the dissolved resin of colored scrap material. By this means, the fibers of the scrap material are kept free of coloring material. Bentonitic clay would be added to the solvent only in connection with the first two washes described above, and in those cases in an amount of approximately 0.75 to 1.5 percent by weight. The final wash of the fiber material would be done with clean solvent as above described without the addition of clay. It will of course be understood that under such circumstances, the clay would be removed from the polymer solution after a given wash by a conventional means and clean clay added to the polymer mixture prior to introduction into the stripper by conventional means.

It is believed that the foregoing constitutes a full and complete disclosure of this invention, and no limitations are intended except as specifically set forth in the claims which follow.

The embodiments of the invention in which an exclusive property or privilege is claimed are defined as follows:

1. The method of treating scrap fabric supported PVC material comprising the steps of:
   a. treating said scrap material with a solvent of the class of aromatic cyclic ether at a temperature less than 200° F. with agitation and in an inert atmosphere having substantially 0 percent water, to strip said PVC from said fabric and place said PVC in solution in said solvent;
   b. withdrawing said solvent and PVC solution and maintaining said solution in said inert, water-free atmosphere
   c. drying said stripped fabric to produce as a first product of reclamation, dry, clean fabric fibers;
   d. concentrating said withdrawn solvent and PVC solution by heating to a temperature in excess of the boiling point of said aromatic cyclic ether solvent but below the degradation temperature of said PVC to flash off as a vapor a portion of said solvent;
   e. continuously evaporating the remainder of said solvent from said solvent and PVC solution to produce as a second product of reclamation solvent free granular PVC; and
   f. condensing said solvent vaporized in said concentrating and continuously evaporating steps to reclaim clean liquid solvent for reuse.

2. The method claim in claim 1 wherein said step of treating said scrap material is accomplished in a plurality of stages with a quantity of solvent introduced at the beginning of each stage and withdrawn at the end of each stage, the first stage utilizing a solvent solution containing not more than about 10 percent PVC, each subsequent stage utilizing a solvent solution containing less PVC than the preceding stage, the final stage utilizing substantially pure solvent.

3. The method claimed in claim 2, wherein the solvent utilized in each stage subsequent to said first stage is withdrawn and utilized without further treatment in the immediately preceding stage in a subsequent operation.

4. The method claimed in claim 1 including the step of drying said scrap material prior to treating it with solvent to remove residual moisture.

5. The method claimed in claim 1 including the step of cutting said scrap material to pieces of a size not larger than about 8 square inches.

6. The method claimed in claim 1 wherein said solvent is tetrahydrafuran.

7. The method claimed in claim 1 wherein said step of continuously evaporating the remainder of said solvent from said solvent and PVC solution is accomplished in a partial vacuum.

8. The method claimed in claim 7 wherein the temperature in said partial vacuum is less than 180° F.

9. The method claimed in claim 1 wherein said process is carried out in a closed system purged with an inert gas.

10. The method claimed in claim 1 including the step of mixing bentonitic clay with said solvent for adsorbing die and pigment released from the scrap material during the agitation period.

* * * * *